US010817898B2

(12) United States Patent
Waldron et al.

(10) Patent No.: US 10,817,898 B2
(45) Date of Patent: Oct. 27, 2020

(54) DETERMINING EXPOSURES TO CONTENT PRESENTED BY PHYSICAL OBJECTS

(71) Applicant: PLACED, LLC, New York, NY (US)

(72) Inventors: Elliott Waldron, Seattle, WA (US); David Shim, Seattle, WA (US); Jack Chua, Seattle, WA (US)

(73) Assignee: PLACED, LLC, New York, NY (US)

( * ) Notice: Subject to any disclaimer, the term of this patent is extended or adjusted under 35 U.S.C. 154(b) by 205 days.

(21) Appl. No.: 15/005,909

(22) Filed: Jan. 25, 2016

(65) Prior Publication Data
US 2017/0213240 A1 Jul. 27, 2017

(51) Int. Cl.
G06Q 30/00 (2012.01)
G06Q 30/02 (2012.01)
H04W 4/02 (2018.01)
G06F 16/29 (2019.01)

(52) U.S. Cl.
CPC ......... G06Q 30/0246 (2013.01); G06F 16/29 (2019.01); H04W 4/023 (2013.01)

(58) Field of Classification Search
None
See application file for complete search history.

(56) References Cited

U.S. PATENT DOCUMENTS

| | | |
|---|---|---|
| 666,223 A | 1/1901 | Shedlock |
| 4,581,634 A | 4/1986 | Williams |
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |

(Continued)

FOREIGN PATENT DOCUMENTS

| | | |
|---|---|---|
| CA | 2887596 A1 | 7/2015 |
| EP | 2051480 A1 | 4/2009 |

(Continued)

OTHER PUBLICATIONS

Rouse, Margaret, WhatIs.com Probability Definition, 2017 (Year: 2017).*

(Continued)

Primary Examiner — Meredith A Long

(57) ABSTRACT

Systems and methods are described herein for determining user exposures to content, such as content presented by physical objects (e.g., advertisements on billboards). The systems and methods may determine a probability (an "exposure probability") that a user has viewed or consumed content, information, or other visual media presented by a physical object, such as a billboard, vehicle, sign, or other structure, and provide the determined probability to various attribution systems, such as systems that attribute user engagements (e.g., store visits, app downloads, website visits, product purchases, and so on) to earlier content exposures.

13 Claims, 9 Drawing Sheets

(56) References Cited

U.S. PATENT DOCUMENTS

| | | | |
|---|---|---|---|
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,485 | B1 | 9/2002 | Anzil |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 7,966,658 | B2 | 6/2011 | Singh et al. |
| 8,001,204 | B2 | 8/2011 | Burtner et al. |
| 8,010,685 | B2 | 8/2011 | Singh et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,131,597 | B2 | 3/2012 | Hudetz et al. |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,195,203 | B1 | 6/2012 | Tseng |
| 8,199,747 | B2 | 6/2012 | Rojas et al. |
| 8,200,247 | B1 | 6/2012 | Starenky et al. |
| 8,208,943 | B2 | 6/2012 | Petersen |
| 8,214,443 | B2 | 7/2012 | Hamburg |
| 8,220,034 | B2 | 7/2012 | Hahn et al. |
| 8,229,458 | B2 | 7/2012 | Busch |
| 8,234,350 | B1 | 7/2012 | Gu et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,296,842 | B2 | 10/2012 | Singh et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |
| 8,471,914 | B2 | 6/2013 | Sakiyama et al. |
| 8,472,935 | B1 | 6/2013 | Fujisaki |
| 8,509,761 | B2 | 8/2013 | Krinsky et al. |
| 8,510,383 | B2 | 8/2013 | Hurley et al. |
| 8,527,345 | B2 | 9/2013 | Rothschild et al. |
| 8,554,627 | B2 | 10/2013 | Svendsen et al. |
| 8,560,612 | B2 | 10/2013 | Kilmer et al. |
| 8,588,942 | B2 | 11/2013 | Agrawal |
| 8,594,680 | B2 | 11/2013 | Ledlie et al. |
| 8,613,088 | B2 | 12/2013 | Varghese et al. |
| 8,613,089 | B1 | 12/2013 | Holloway et al. |
| 8,660,358 | B1 | 2/2014 | Bergboer et al. |
| 8,660,369 | B2 | 2/2014 | Llano et al. |
| 8,660,793 | B2 | 2/2014 | Ngo et al. |
| 8,682,350 | B2 | 3/2014 | Altman et al. |
| 8,718,333 | B2 | 5/2014 | Wolf et al. |
| 8,724,622 | B2 | 5/2014 | Rojas |
| 8,732,168 | B2 | 5/2014 | Johnson |
| 8,744,523 | B2 | 6/2014 | Fan et al. |
| 8,745,132 | B2 | 6/2014 | Obradovich |
| 8,761,800 | B2 | 6/2014 | Kuwahara |
| 8,768,876 | B2 | 7/2014 | Shim et al. |
| 8,775,972 | B2 | 7/2014 | Spiegel |
| 8,788,680 | B1 | 7/2014 | Naik |

(56) References Cited

U.S. PATENT DOCUMENTS

| | | |
|---|---|---|
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Roote et al. |
| 8,909,725 B1 | 12/2014 | Sehn |
| 8,942,953 B2 | 1/2015 | Yuen et al. |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,161,084 B1 * | 10/2015 | Sharma .............. G06K 9/00778 |
| 9,191,776 B2 | 11/2015 | Root et al. |
| 9,204,252 B2 | 12/2015 | Root |
| 9,225,897 B1 | 12/2015 | Sehn et al. |
| 9,256,832 B2 | 2/2016 | Shim et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244633 A1 | 10/2007 | Phillips et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0140479 A1 * | 6/2008 | Mello .................. G06Q 30/02 705/14.54 |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0248815 A1 * | 10/2008 | Busch .................. H04W 4/029 455/456.5 |
| 2008/0255976 A1 | 10/2008 | Altberg et al. |
| 2008/0256446 A1 | 10/2008 | Yamamoto |
| 2008/0256577 A1 | 10/2008 | Funaki et al. |

(56) References Cited

U.S. PATENT DOCUMENTS

| | | |
|---|---|---|
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0312946 A1* | 12/2008 | Valentine ............ G06Q 20/382 705/64 |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089558 A1 | 4/2009 | Bradford et al. |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collison |
| 2009/0199242 A1 | 8/2009 | Johnson et al. |
| 2009/0204354 A1 | 8/2009 | Davis et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0259436 A1* | 10/2009 | Doe ....................... G06Q 30/02 702/181 |
| 2009/0265215 A1* | 10/2009 | Lindstrom ............ G06Q 30/02 705/7.32 |
| 2009/0265647 A1 | 10/2009 | Martin et al. |
| 2009/0276235 A1 | 11/2009 | Benezra et al. |
| 2009/0278738 A1 | 11/2009 | Gopinath |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0041378 A1 | 2/2010 | Aceves et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161720 A1 | 6/2010 | Colligan et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0211425 A1 | 8/2010 | Govindarajan |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0223346 A1 | 9/2010 | Dragt |
| 2010/0250109 A1 | 9/2010 | Johnston et al. |
| 2010/0257036 A1 | 10/2010 | Khojastepour et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0076653 A1 | 3/2011 | Culligan et al. |
| 2011/0083101 A1 | 4/2011 | Sharon et al. |
| 2011/0099046 A1 | 4/2011 | Weiss et al. |
| 2011/0099047 A1 | 4/2011 | Weiss et al. |
| 2011/0099048 A1 | 4/2011 | Weiss et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0161163 A1* | 6/2011 | Carlson ................. G06Q 30/02 705/14.44 |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215903 A1 | 9/2011 | Yang et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |

(56) References Cited

U.S. PATENT DOCUMENTS

| | | |
|---|---|---|
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0246004 A1 | 9/2012 | Book et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0264446 A1 | 10/2012 | Xie et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0225202 A1 | 8/2013 | Shim et al. |
| 2013/0226857 A1 | 8/2013 | Shim et al. |
| 2013/0227476 A1 | 8/2013 | Frey |
| 2013/0232194 A1 | 9/2013 | Knapp et al. |
| 2013/0254227 A1 | 9/2013 | Shim et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0339140 A1* | 12/2013 | Pokorny ............ G06Q 30/0242 705/14.49 |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0172541 A1* | 6/2014 | Bruich ............... G06Q 30/0242 705/14.43 |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0249886 A1* | 9/2014 | Levinsohn ......... G06Q 30/0242 705/7.29 |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0304212 A1 | 10/2014 | Shim et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0379477 A1* | 12/2014 | Sheinfeld ........... G06Q 30/0251 705/14.58 |
| 2015/0006278 A1* | 1/2015 | Di Censo ........... G06K 9/00845 705/14.43 |
| 2015/0020086 A1 | 1/2015 | Chen et al. |
| 2015/0029176 A1* | 1/2015 | Baxter .................... G06T 15/00 345/419 |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |

(56) References Cited

U.S. PATENT DOCUMENTS

| | | | |
|---|---|---|---|
| 2015/0172534 A1 | 6/2015 | Miyakawa et al. | |
| 2015/0178260 A1 | 6/2015 | Brunson | |
| 2015/0222814 A1 | 8/2015 | Li et al. | |
| 2015/0261917 A1 | 9/2015 | Smith | |
| 2015/0312184 A1 | 10/2015 | Langholz et al. | |
| 2015/0350136 A1 | 12/2015 | Flynn, III et al. | |
| 2015/0365795 A1 | 12/2015 | Allen et al. | |
| 2015/0378502 A1 | 12/2015 | Hu et al. | |
| 2016/0006927 A1 | 1/2016 | Sehn | |
| 2016/0014063 A1 | 1/2016 | Hogeg et al. | |
| 2016/0048869 A1 | 2/2016 | Shim et al. | |
| 2016/0063559 A1* | 3/2016 | Hargrove | G06Q 30/0261 705/14.58 |
| 2016/0078485 A1 | 3/2016 | Shim et al. | |
| 2016/0085773 A1 | 3/2016 | Chang et al. | |
| 2016/0085863 A1 | 3/2016 | Allen et al. | |
| 2016/0099901 A1 | 4/2016 | Allen et al. | |
| 2016/0157062 A1 | 6/2016 | Shim et al. | |
| 2016/0180887 A1 | 6/2016 | Sehn | |
| 2016/0182422 A1 | 6/2016 | Sehn et al. | |
| 2016/0182875 A1 | 6/2016 | Sehn | |
| 2016/0239248 A1 | 8/2016 | Sehn | |
| 2016/0277419 A1 | 9/2016 | Allen et al. | |
| 2016/0321708 A1 | 11/2016 | Sehn | |
| 2017/0006094 A1 | 1/2017 | Abou Mahmoud et al. | |
| 2017/0038213 A1* | 2/2017 | Han | G01C 21/16 |
| 2017/0061308 A1 | 3/2017 | Chen et al. | |
| 2017/0287006 A1 | 10/2017 | Azmoodeh et al. | |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO 2007092668 | 8/2007 |
| WO | WO-2009043020 A2 | 4/2009 |
| WO | WO-2011040821 A1 | 4/2011 |
| WO | WO-2011119407 A1 | 9/2011 |
| WO | WO 2013008238 | 1/2013 |
| WO | WO-2013008238 | 1/2013 |
| WO | WO-2013045753 A1 | 4/2013 |
| WO | WO 2014006129 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

Gregorich et al., "Verification of AIRS Boresight Accuracy Using Coastline Detection" IEEE Transactions on Geoscience and Remote Sensing, vol. 41, Issue 2, (2003) pp. 298-302.

Hsu-Yang Kun et al., "Using RFID Technology and SOA with 4D Escape Route" Wireless Communications, Networking and Mobile Computing (2008) pp. 1-4.

Ning Xia et al., "GeoEcho: Inferring User Interests from Geotag Reports in Network Traffic" IEEE/WIC/ACM International Joint Conferences, vol. 2 (2014) pp. 1-8.

"A Whole New Story", URL: https://www.snap.com/en-US/new/, (2017), 13 pgs.

"Adding a watermark to your photos", eBay, URL: http://pages.ebay.com/help/sell/pictures.html, (accessed May 24, 2017), 4 pgs.

"BlogStomp", URL: http://stompsoftware.com/blogstomp, (accessed May 24, 2017), 12 pgs.

"Cup Magic Starbucks Holiday Red Cups come to life with AR app", URL: http://www.blastradius.com/work/cup-magic, (2016), 7 pgs.

"Daily App: InstaPlace (iOS/Android): Give Pictures a Sense of Place", TechPP, URL: http://techpp.com/2013/02/15/instaplace-app-review, (2013), 13 pgs.

"InstaPlace Photo App Tell the Whole Story", URL: https://youtu.be/uF_gFkg1hBM, (Nov. 8, 2013), 113 pgs.

"International Application Serial No. PCT/US2015/037251, International Search Report dated Sep. 29, 2015", 2 pgs.

"Introducing Snapchat Stories", URL: https://www.youtube.com/watch?v=88Cu3yN-LIM, (Oct. 3, 2013), 92 pgs.

"Macy's Believe-o-Magic", URL: https://www.youtube.com/watch?v=xvzRXy3J0Z0, (Nov. 7, 2011), 102 pgs.

"Macys Introduces Augmented Reality Experience in Stores across Country as Part of Its 2011 Believe Campaign", URL: https://www.businesswire.com/news/home/20111102006759/en/Macys-Introduces-Augmented-Reality-Experience-Stores-Country, (Nov. 2, 2011), 6 pgs.

"Starbucks Cup Magic", URL: https://www.youtube.com/watch?v=RWwQXi9RG0w, (Nov. 8, 2011), 87 pgs.

"Starbucks Cup Magic for Valentine's Day", URL: https://www.youtube.com/watch?v=8nvqOzjq10w, (Feb. 6, 2012), 88 pgs.

"Starbucks Holiday Red Cups Come to Life, Signaling the Return of the Merriest Season", URL: http://www.businesswire.com/news/home/20111115005744/en/2479513/Starbucks-Holiday-Red-Cups-Life-Signaling-Return, (Nov. 15, 2011), 5 pgs.

Carthy, Roi, "Dear All Photo Apps: Mobli Just Won Filters", URL: https://techcrunch.com/2011/09/08/mobli-filters, (Sep. 8, 2011), 10 pgs.

Janthong, Isaranu, "Android App Review Thailand", URL: http://www.android-free-app-review.com/2013/01/instaplace-android-google-play-store.html, (Jan. 23, 2013), 9 pgs.

Macleod, Duncan, "Macys Believe-o-Magic App", URL: http://theinspirationroom.com/daily/2011/macys-believe-o-magic-app, (Nov. 14, 2011), 10 pgs.

Macleod, Duncan, "Starbucks Cup Magic Lets Merry", URL: http://theinspirationroom.com/daily/2011/starbucks-cup-magic, (Nov. 12, 2011), 8 pgs.

Notopoulos, Katie, "A Guide to the New Snapchat Filters and Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.

Panzarino, Matthew, "Snapchat Adds Filters, a Replay Function and for Whatever Reason, Time, Temperature and Speed Overlays", URL: https://techcrunch.com/2013/12/20/snapchat-adds-filters-new-font-and-for-some-reason-time-temperature-and-speed-overlays!, (Dec. 20, 2013), 12 pgs.

Tripathi, Rohit, "Watermark Images in PHP and Save File on Server", URL: http://code.rohitink.com/2012/12/28/watermark-images-in-php-and-save-file-on-server, (Dec. 28, 2012), 4 pgs.

* cited by examiner

DETERMINING EXPOSURES TO CONTENT PRESENTED BY PHYSICAL OBJECTS

CROSS-REFERENCE TO RELATED APPLICATIONS

This application is related to U.S. patent application Ser. No. 14/825,978, filed on Aug. 13, 2015, entitled ATTRIBUTING IN-STORE VISITS TO MEDIA CONSUMPTION BASED ON DATA COLLECTED FROM USER DEVICES, which is hereby incorporated by reference in its entirety.

BACKGROUND

Advertisers utilize various media channels to advertise their products and services to consumers. For example, advertisers use emails and online advertisements ("ads") on websites and mobile applications, or place content within the physical world (e.g., via billboards, signs on buildings or vehicles, and Out of Home (OOH) locations). However, the consumption of content often occurs at one location or via one medium, and the engagement in the desired behavior occurs at another online or real-world location (e.g., a customer visits a store after seeing a billboard advertising a sale at the store, or downloads a mobile application after learning about the application via a sign in a stadium). Advertisers and other content providers generally do not have an effective way of knowing whether the ad had any impact on the consumer.

DETAILED DESCRIPTION

Figure 1:
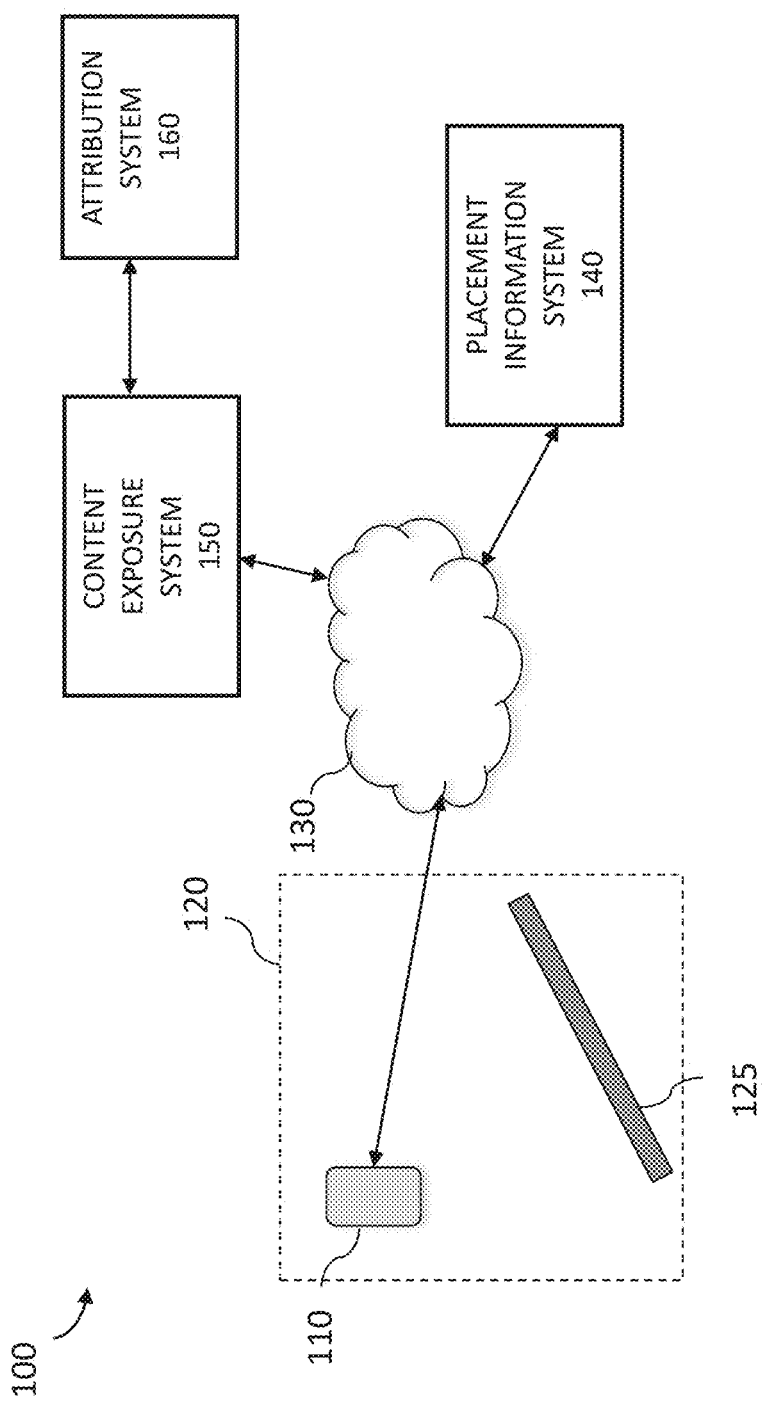
FIG. 1 is a block diagram illustrating a suitable computing environment for determining exposures to content presented by physical objects.

Systems and methods are described herein for determining user exposures to content, such as content presented by physical objects (e.g., advertisements on billboards). The systems and methods may determine a probability (an "exposure probability") that a user has viewed or consumed content, information, or other visual media presented by a physical object, such as a billboard, vehicle, sign, or other structure, and provide the determined probability to various attribution systems, such as systems that attribute user engagements (e.g., store visits, app downloads, website visits, product purchases, and so on) to earlier content exposures.

In some embodiments, the systems and methods receive device location information associated with a target mobile device positioned at a certain geographic location, and receive object placement information associated with content presented by a physical object at the certain geographic location. The systems and methods determine an exposure probability that is based on a comparison of the received device location information to the received object placement information, and, in some cases, provide the determined exposure probability to an attribution system.

For example, the systems and methods may determine a mobile device associated with a user is located within a viewshed of content presented by a physical object, and determine the mobile device associated with the user moved toward a facing direction of the physical object, where the facing direction of the physical object is a direction that presents the content.

The systems and methods may generate an exposure probability for an exposure of content presented by the physical object to the user, where the exposure probability is generated based on locations of the mobile device within the viewshed of the content presented by the physical object and based on an angle between a direction of movement of the mobile device and a facing direction of the physical object. The systems and methods may then attribute the exposure of the content presented by the physical object of the user to a conversion or engagement event associated with the user based at least in part on the generated probability.

In some embodiments, the systems and methods may include at least one server computer coupled to a network, and at least one memory storing instructions for execution by the computer. The server computer receives device location information associated with each of multiple mobile phones positioned at certain geographic locations, where each mobile phone provides, directly or indirectly, a series of location coordinates to the server computer via the network. The server computer then accesses object placement information associated with visually-perceptible content presented by physical objects at the certain geographic locations, where the object placement information for each physical object includes viewshed characteristics for the physical object. The server computer then computes exposure probabilities based on a comparison of each received device location information to the accessed object placement information, where each computed exposure probability represents a probability that a user of one of the multiple mobile phones visually perceived content presented by one of the physical objects.

Thus, in some embodiments, the systems and methods may facilitate the attribution of customer engagements to previous exposures of Out of Home advertisements and other real or physical world content displays, among other benefits.

Various embodiments and implementations of the attribution system will now be described. The following description provides specific details for a thorough understanding and an enabling description of these embodiments and implementations. One skilled in the art will understand, however, that the embodiments and implementations may be practiced without many of these details. Additionally, some well-known structures or functions may not be shown or described in detail, so as to avoid unnecessarily obscuring the relevant description of the various embodiments and implementations. The terminology used in the description presented below is intended to be interpreted in its broadest reasonable manner, even though it is being used in conjunction with a detailed description of certain specific embodiments and implementations of the attribution system.

Examples of a Suitable Computing Environment

FIG. 1 is a block diagram illustrating a suitable computing environment 100 for determining exposures to content presented by physical objects. The computing environment 100 includes a mobile device 110, such as a smart phone, tablet computer, smart watch, and so on, that is positioned within a certain geographical area or location 120. The location 120 includes a physical object 125 (e.g., advertising billboard), that presents visual content to a user associated with the mobile device 110.

A content exposure system 150 communicates with the mobile device 110 over a network 130, such as the Internet. The content exposure system 150 may include various components, modules, and/or algorithms configure to perform the various processes described herein, such as processes for determining whether a user associated with the mobile device 110 is exposed to content presented by the physical object 125 within the location 120.

The content exposure system 150 may receive information, over the network 130, from a variety of sources, and utilize the received information when determining whether users are exposed to OOH advertising and other visual content within the real world. For example, the content exposure system 150 may access or receive information from various sensors of the mobile device 110 (e.g., GPS sensors, triangulation components, and so on) that indicate a location, orientation, heading, direction, velocity, speed, or other information indicative of a previous, current, or predicted location of the mobile device 110 and/or an orientation of the mobile device with three-dimensional space.

The content exposure system 150 may also access or receive information associated with the physical object 125, such as placement information for the physical object 125 from a placement information system 140 or other database or system that stores and maintains information associated with objects presenting content in the real world. In some cases, the content exposure system 150 may store or maintain placement information. Example placement information may include various characteristics associated with the placement of the physical object 125 within the location 120, such as Latitude and Longitude (lat long) information, information identifying a cardinal direction (e.g., north, east, west, south) for the content presented by the physical object 125, the date or time range for the content, weekly impression and reach estimates, placement type information (e.g., the type of object, such as a bulletin, a poster, a billboard, a vehicle, a transit shelter, and so on).

In some embodiments, the content exposure system 150 sends information to an attribution system 160, such as information representing estimated or determined probabilities or likelihoods of user exposures to content presented by physical objects. Further details regarding the attribution system 160 will now be discussed.

The Attribution System

The attribution system 160 disclosed herein ties content, such as advertisements ("ads") and other information or content impressions to visits to target places, to provide content providers or advertisers one or more metrics characterizing the effectiveness of the ad impressions. Based on impression data associated with an ad campaign (e.g., exposure probabilities) and geolocation data collected directly from a panel of mobile device users ("panelists"), the attribution system 160 attributes real-world, physical visits and other conversion events to exposures of Out of Home (OOH) advertisements and content. In many instances, the attribution is a function of time elapsed between the exposure and the conversion event, such as a visit to a physical place associated with the advertisement. A place, as used herein, includes any physical establishment, for example, a restaurant, a park, a store, a gas station, and so on.

The attribution system 160, in some embodiments, leverages a data collection system to obtain user information, including location data, collected directly from the panelists. The data collection system obtains and validates location data from the panelists. The user information collected by the data collection system includes, for example, latitude, longitude, altitude determinations, sensor data (e.g., compass/bearing data, accelerometer or gyroscope measurements), and other information that can be used to identify a panelist's location and activity. Additional details on the data collection system can be found in U.S. patent application Ser. No. 13/405,182, which is hereby incorporated by reference in its entirety.

In some embodiments, the data collection system may receive, obtain, or access information from third party sources in order to enhance or modify attribution metrics for ad impressions. For example, a third party source of data, such as a payment processor or social network, may provide data confirming a purchase or use of a product or service associated with an ad impression. Such purchase or use information may, therefore, augment the data associated with an ad campaign and the geolocation data collected directly from the panel of mobile electronic device users.

In some embodiments, the attribution system 160 may receive, obtain, or access information from third party sources in order to measure purchase data from a larger population of users, such as any users associated with a third party source. For example, the attribution system may utilize purchase or use data directly from the third party sources (e.g., data indicating a user or group of users made a purchase of a product or service at a certain location, via a certain retailer, and so on) as attribution for ad impressions.

The attribution system 160, in various embodiments, also leverages an inference pipeline that recognizes, based on location readings, whether a user visited a target place, and if so, determines the probability of the user at the target place and how much time the user spent at the target place. Additional details on the inference pipeline can be found in U.S. Pat. No. 8,768,876, which is hereby incorporated by reference in its entirety.

In some embodiments, the process of attributing a visit to a target place starts with an advertiser (e.g., a mobile advertiser HMC) delivering ads (e.g., mobile ads, desktop ads, television ads) through an ad-network to a group of users on their devices (e.g., mobile devices, desktop computers, television, voice telephony, tablets, mobile gaming devices, smart phones) as part of an ad campaign. In other embodiments, ads may be delivered to, or accessed by, the group of users via other media types, such as via print, billboards, radio, and others described herein.

Users who receive the ad impressions form a campaign population. The advertiser or the ad-network provides impression data and details of the ad campaign to the attribution system. The impression data can include, for example, device identifiers, impression timestamps, targeting identifiers, and other metadata associated with the campaign or the target of the impression. For example, the metadata may include user agent strings and segment identifiers. The attribution system then uses the device identifier, IP address, device model, operating system version and/or any other metadata to match the campaign population against the panelists of the attribution system to identify panelists who were exposed to the ad impressions ("impression population"). In some embodiments, impression data can be collected by the attribution system.

After identifying the impression population based on the match, a baseline population is constructed in one of two ways. First, the advertiser may provide an indicator within the impression population that codes for membership in a control group (e.g., those impressions associated with no advertisement or the presentation of an unrelated advertisement). When no control group is specified, the attribution system identifies the panelists who did not match and includes them into a baseline or control group. The attribution system then performs experimental analysis to assess whether the ad impression had any impact on changing the impression users' physical store visitation behavior. In some embodiments, the attribution system can perform other analyses. For example, the attribution system can determine metrics such as costs per store visit, frequency of store visits, likelihood of store visits for different geography and demographics, or the like. These and other metrics from the analyses enable advertisers to make adjustments to their ad campaigns to improve performance (e.g., increase store visits, target certain demographics). The metrics generated by the attribution system 160 also describe or characterize the nature of the ad campaign run by advertisers.

Thus, in some embodiments, the attribution system 160 performs various processes for attributing real world (e.g., store visits, purchases) or online-based (e.g., website visits, app downloads) conversion events and actions to OOH exposures determined by the content exposure system 150. Further details regarding the attribution system 160 may be found in U.S. patent application Ser. No. 14/825,978, filed on Aug. 13, 2015, entitled ATTRIBUTING IN-STORE VISITS TO MEDIA CONSUMPTION BASED ON DATA COLLECTED FROM USER DEVICES, which is hereby incorporated by reference in its entirety.

Examples of Determining User Exposures to Out of Home Presented Content

Figure 2:
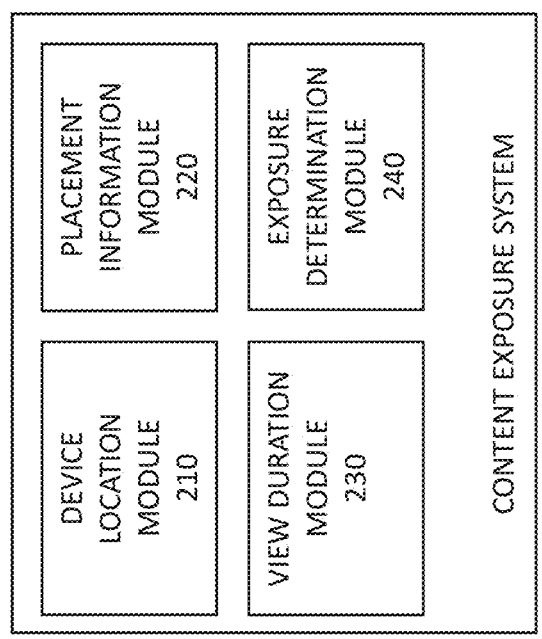
FIG. 2 is a block diagram illustrating modules of a content exposure system.

As described herein, the systems and methods may utilize device characteristics and placement characteristics when determining probabilities of user exposures to content presented by physical objects. FIG. 2 is a block diagram illustrating modules of the content exposure system 150. The content exposure system 150 may include one or more modules and/or components to perform operations for determining probabilities of user exposure to content. The modules and/or components may be hardware, software, or a combination of hardware and software, and may be executed by one or more processors. For example, the content exposure system 150 may include a device location module 210, a placement information module 220, a view duration module 230, and an exposure determination module 240.

In some embodiments, the device location module 210 is configured and/or programmed to receive device location information associated with a target mobile device positioned at a certain geographic location. For example, the device location module 210 may receive a series of lat long (latitude and longitude) coordinates for the mobile device 110 within the location 120, and determine location sensor trace information using the coordinates.

Figure 3:
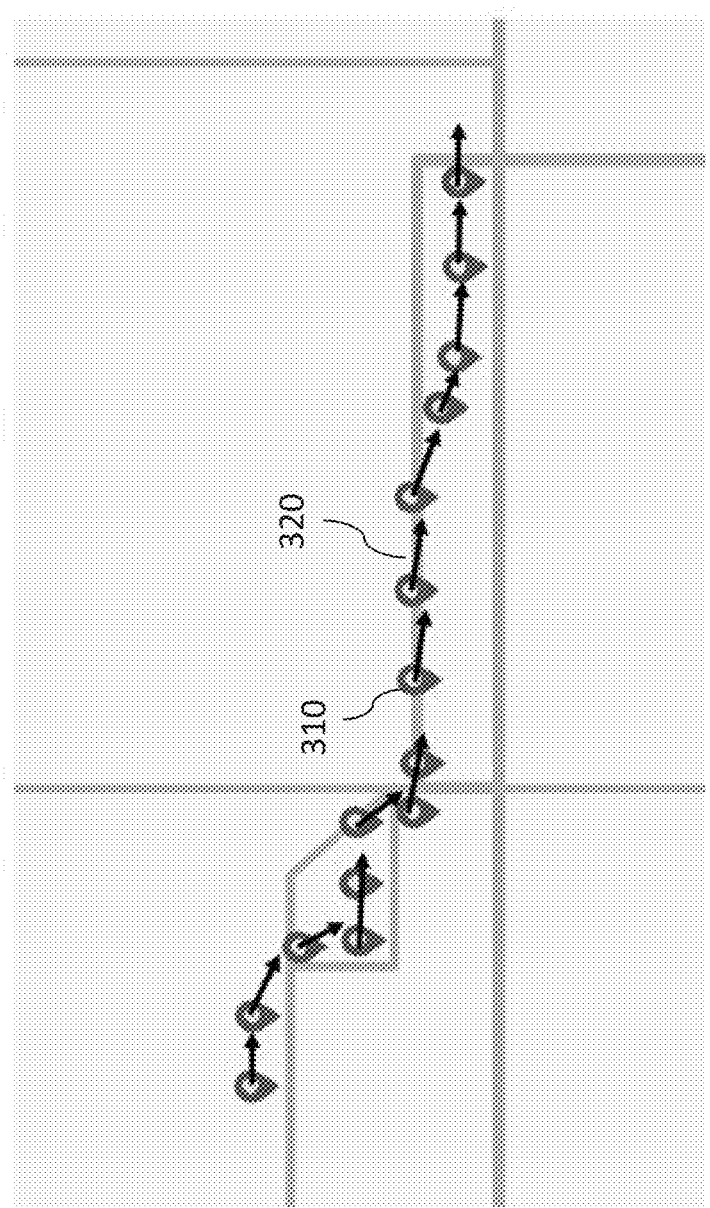
FIG. 3 is a diagram illustrating location trace characteristics representing a location of a mobile device.

FIG. 3 is a diagram 300 illustrating displayed location trace characteristics for a mobile device. The diagram 300 includes raw location points 310 for the mobile device 110 and smooth heading estimates 320 for the mobile device 110 as the mobile device 110 moves through space. The smooth heading estimates may be based on one or more estimation algorithms that determine estimates 320 of heading directions for the mobile device 110 based on the positional or location data 310 (e.g., GPS data, accelerometer data, gyroscope data, and so on) of the mobile device 110.

For example, the device location module 210 may determine a moving average of the differences in latitudes and longitudes of the positions 310 to obtain a smoothed estimate for the device heading. As another example, the device location module 210 may utilize Kalman filtering or other techniques when determining heading estimates for the mobile device 110.

Referring back to FIG. 2, in some embodiments, the placement information module 220 is configured and/or programmed to receive object placement information associated with content presented by a physical object at the certain geographic location. For example, the placement information module 220 may receive and/or generate a placement viewshed for the physical object based on a geography, location, or area that is viewable from the physical object.

The placement information module 220, in some embodiments, may utilize placement information received from the placement information system 140, and determine or modify the information to reflect certain geographical features surrounding the physical object 125 within the location 120. For example, when the physical object 125 is a billboard positioned in a city where streets and billboards face at roughly 45 degree angles to the cardinal directions, the placement information module 220 may analyze the direction of proximate roads, in order to determine an accurate and facing direction for the physical object 125.

Figure 4:
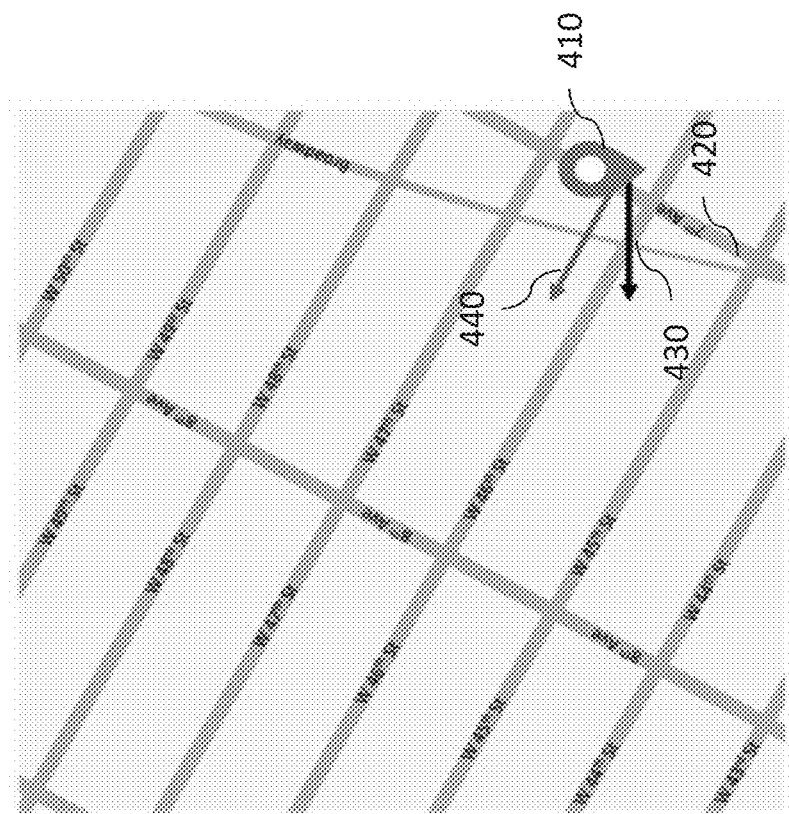
FIG. 4 is a diagram illustrating placement characteristics for a physical object.

Following the example, FIG. 4 is a map diagram 400 illustrating modified placement characteristics for a billboard 410. The billboard is located proximate to 7th Avenue, shown as road 420 within the map diagram 400, which travels at an angle approximately 30 degrees from the N-S cardinal direction. The placement information module 220, utilizing the information from the map diagram 420, modifies the facing angle 440 of the billboard to be 30 degrees North of West, instead of a given facing angle 430 of due West, from data provided by the placement information system 140.

In addition, the placement information module 220 generates or determines a viewshed for the physical object 125, based on a density of structures and other features within the surrounding geography of the location 120. For example, if an observer is within a viewable distance of a billboard on I-90 in Montana, the billboard is likely to be viewable from roughly 90 degrees to the left or right of the facing direction of the billboard. However, a billboard in Manhattan may be only viewable from a narrow corridor along the street running parallel to the facing direction of the billboard. Thus, the angle of the viewshed for an interstate highway billboard may be larger than the angle of the viewshed for a billboard in a dense urban area.

In order to account for variations in surrounding geographies, the placement information module 220 may determine, generate, or estimate a viewshed for a physical object using a variety of different estimation techniques or processes. For example, the placement information module 220 may perform the following operations to estimate a viewshed for a billboard.

First, the placement information module 220 defines the viewshed to be a "cone" of visibility emanating at a specific angle from a facing direction of a billboard, such as an arbitrary partition of geographic space. Next, the placement information module 220 generates panel impressions by assuming a 90 degree viewshed for the billboard (e.g., panel impressions as discussed herein with respect to the attribution system 160 or based on received ground truth data for the billboard).

The placement information module 220 regresses weekly estimates of impressions (e.g., via 3rd party source or proprietary survey-based data) to the panel impressions, and regresses residuals against a variable set of data that includes information about nearby road segments, nearby structures, and the number and nature of nearby businesses that surround the billboard.

Then, the placement information module 220 determine the viewshed angle by transforming the predicted residual. For example, a positive (or, negative) residual suggests that the panel impression data over- (or, under-) estimates the ground truth impression estimates, and that the viewshed angle should be made smaller (or, larger) than the initial set value of 90 degrees. Next, to estimate the viewshed for a specific or given placement of the billboard, placement information module 220 intersects a geofence (e.g., derived from 3rd party sources, such as a mapping application) associated with a type of placement along with the estimated viewshed angle.

Figure 5B:
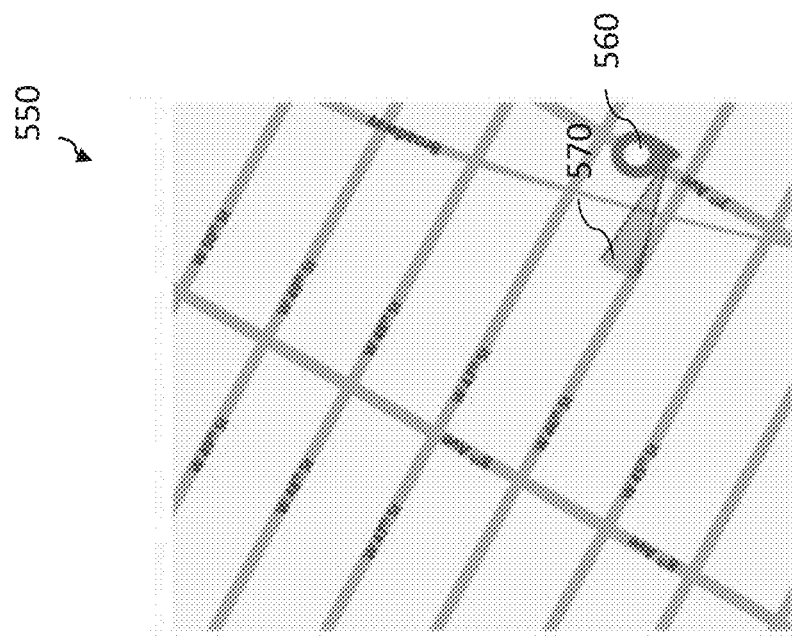
FIGS. 5A-5B are diagrams illustrating viewsheds for content presented by physical objects.
Figure 5A:
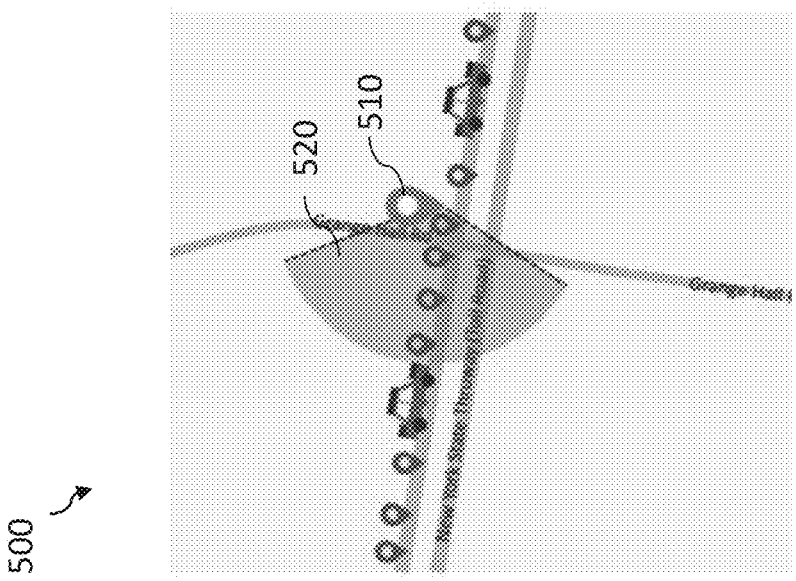

For example, FIG. 5A depicts a wide estimated angle (e.g., 60-90 degrees) for a viewshed 520 of a billboard 510 positioned at an open-freeway location 500. As another example, FIG. 5B depicts a narrow estimated angle (e.g., 5-30 degrees) for a viewshed 570 of a billboard 560 positioned within a dense or urban location 550.

Thus, the placement information module 220 may receive information associated with placement of the content presented by the physical object 125 and/or may generate or modify placement characteristics (e.g., facing angle, estimated viewshed) for the physical object 125.

Referring back to FIG. 2, in some embodiments, the exposure determination module 230 is configured and/or programmed to determine an exposure probability that is based on a comparison of the received device location information to the received object placement information. For example, the exposure determination module 230 may determine a positive or actual exposure of a user to content when a position of a target mobile device is within an estimated viewshed for content presented by a physical object, and when a directional heading of the target mobile device with respect to a presentation angle of the content presented by the physical object is within an angle of 90 degrees.

In some embodiments, the exposure determination module 230 may determine an exposure probability (e.g., from 0 percent probability of exposure to 100 probability of exposure) as a function of the received device location information and the received object placement information, using the following formula:

$$L\_exposure = F(EXPOSURE | Pu, Bi);$$

where L_exposure is the exposure probability, EXPOSURE is a state of exposure (e.g., based on collected ground truth data of asking panelists if they remember seeing specific content at a specific time via mobile surveys sent to their devices), Pu is a set of location trace characteristics for the target mobile device, and Bi is a set of placement characteristics of the content presented by the physical object.

In some embodiments, the view duration module 240 is configured and/or programmed to receive view duration information associated with a time duration within which the target mobile device is positioned within the certain geographic location. For example, the view duration module 240 may receive information identifying a time period within which the mobile device 110 was positioned within the location 120.

Thus, in some embodiments, the exposure determination module 230 may utilize location data for the mobile device 110 within the location 120 to derive device-level measures of viewability, by taking a dynamic location trace (see FIG. 3) of the mobile device 110. Using the trace information, the exposure determination module 230 may dynamically determine various different characteristics during a potential exposure of a user to an advertisement or other content. As described herein, these characteristics include:

Device heading angle information, where an exposure is more likely when a subject device is moving toward the facing direction of a physical object (e.g., the direction towards which presented advertisements and other content faces);

Placement viewshed information, where a viewshed may be narrower in dense urban environments than near freeways with few occluding structures; and Dwell or duration information, where an exposure is more likely when the mobile device 110 is located proximate to an advertisement (e.g., in a viewable state) for a certain time period; and so on.

Thus, using heading information associated with the mobile device 110, and viewshed information associated with the content presented by the physical object 125, the exposure determination module 230 may determine the mobile device is exposed (e.g., determine an exposure probability or likelihood of 90-100 percent) when the position of the device is within the viewshed of the physical object 125, and the angle of the heading of the mobile device 110 relative to the facing angle of the physical object 125 is within 90 degrees (or another suitable range).

Figure 6:
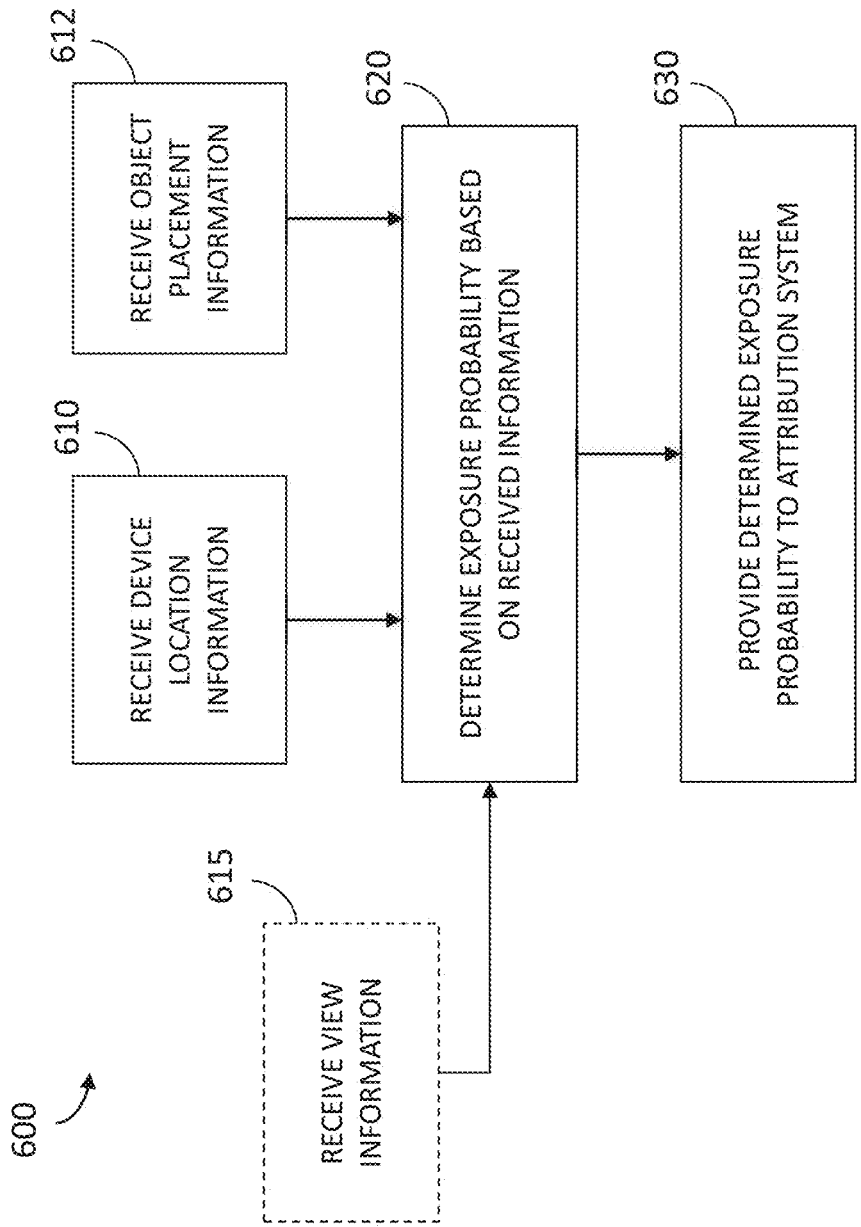
FIG. 6 is a flow diagram Illustrating a method of providing content exposure information to an attribution system.

As described herein, the content exposure system 150 performs various algorithmic processes when determining whether a device (or, associated user) is exposed to content presented by a physical object (e.g., a billboard advertisement), and providing the exposure information to systems that attribute exposures to conversion events and other associated user actions. FIG. 6 is a flow diagram Illustrating a method 600 of providing content exposure information to an attribution system. The method 600 may be performed by the content exposure system 150 and, accordingly, is described herein merely by way of reference thereto. It will be appreciated that the method 600 may be performed on any suitable hardware or devices/components within the content exposure system 150.

In operation 610, the content exposure system 150 receives device location information associated with a target mobile device positioned at a certain geographic location. For example, the device location module 210 may receive a series of lat long (latitude and longitude) coordinates for the mobile device 110 within the location 120, and determine heading information for the target mobile device using the coordinates.

In operation 612, the content exposure system 150 receives object placement information associated with content presented by a physical object at the certain geographic location. For example, the placement information module 220 may receive and/or generate a placement viewshed for the physical object based on a geography, location, or area that is viewable from the physical object.

Optionally, in operation 615, the content exposure system 150 receives view duration information associated with a time duration within which the target mobile device is positioned within the certain geographic location. For example, the view duration module 240 may receive information identifying a time period within which the mobile device 110 was positioned within the location 120.

In operation 620, the content exposure system 150 determines an exposure probability that is based on a comparison of the received device location information to the received object placement information. For example, the exposure determination module 230 may determine a positive or actual exposure of a user to content when a position of a target mobile device is within an estimated viewshed for content presented by a physical object, and when a directional heading of the target mobile device with respect to a presentation angle of the content presented by the physical object is within an angle of 90 degrees.

As described herein, the exposure determination module 230 may determine an exposure probability as a function of the received device location information and the received object placement information, as L_exposure=F(EXPOSURE|Pu, Bi); where L_exposure is the exposure probability, EXPOSURE is a state indicating that the object was viewed, Pu is a set of location trace characteristics for the target mobile device, and Bi is a set of placement characteristics of the content presented by the physical object. The determined exposure probability may be a binary value (e.g., exposure=yes or confirmed or exposure=no) and/or may be within a range of probabilities (0 percent to 100 percent), as described herein.

Figure 7:
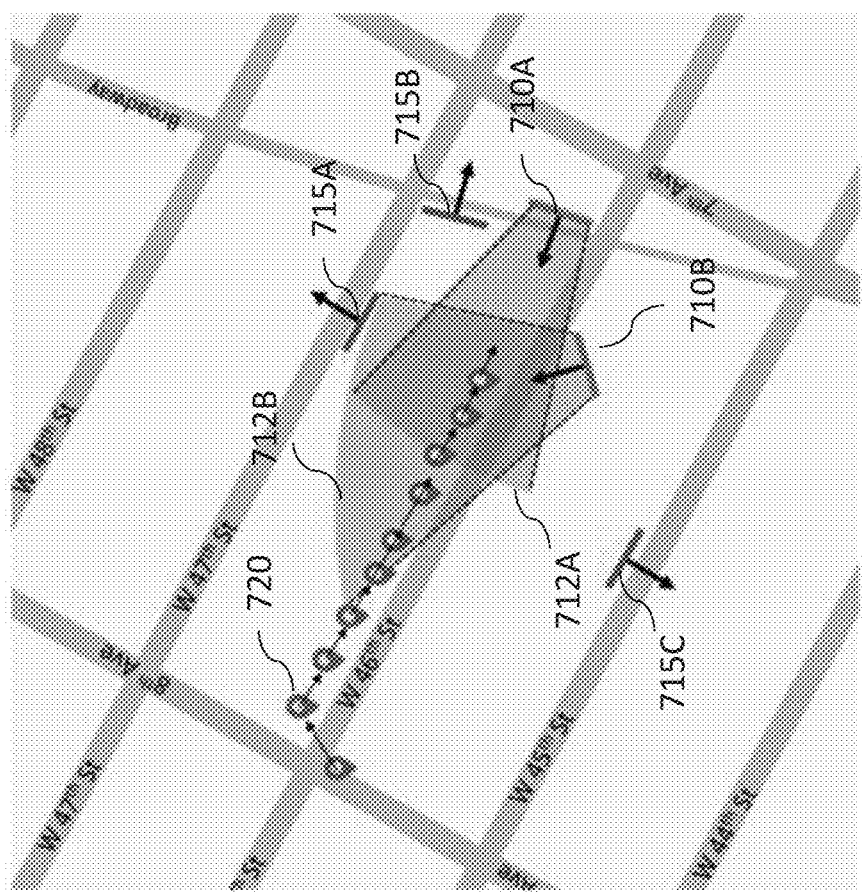
FIG. 7 is a diagram illustrating a comparison of placement characteristics of content presented by a physical object to location information of a target mobile device.

FIG. 7 is a diagram 700 illustrating a comparison of placement characteristics of content presented by a physical object to location information of a target mobile device. The diagram 700 may represent location 120, where the mobile device 110 is positioned and travels a trace 720 of positions with respect to various billboards 710A-B and 715A-C. As depicted, the estimated heading of the trace 720 of the mobile device 110 is in the direction of the billboards 710A-B and within viewsheds 712A, 712B of the billboards 710A, 710B, respectively, and not within viewsheds of the other billboards 715A-C. Therefore, the exposure determination module 230 determines the mobile device 110 is exposed to billboards 710A and 710B and assigns a high or 100 percent exposure probability to the billboards 710A and 710B, and determines the mobile device 110 is not exposed to billboards 715A-C, and assigns a low or 0 percent exposure probability to the billboards 715A-C.

In operation 630, the content exposure system 150 provides the determined exposure probability to an attribution system. For example the content exposure system 150 may provide estimated probability values to the attribution system 160 or other entities configured to measure advertisement effectiveness for various different types of conversions and conversion events, such as website visits and/or purchases and application installs, physical stores visits and/or purchases, attitudinal survey responses for brand and/or product awareness, and so on.

Figure 8:
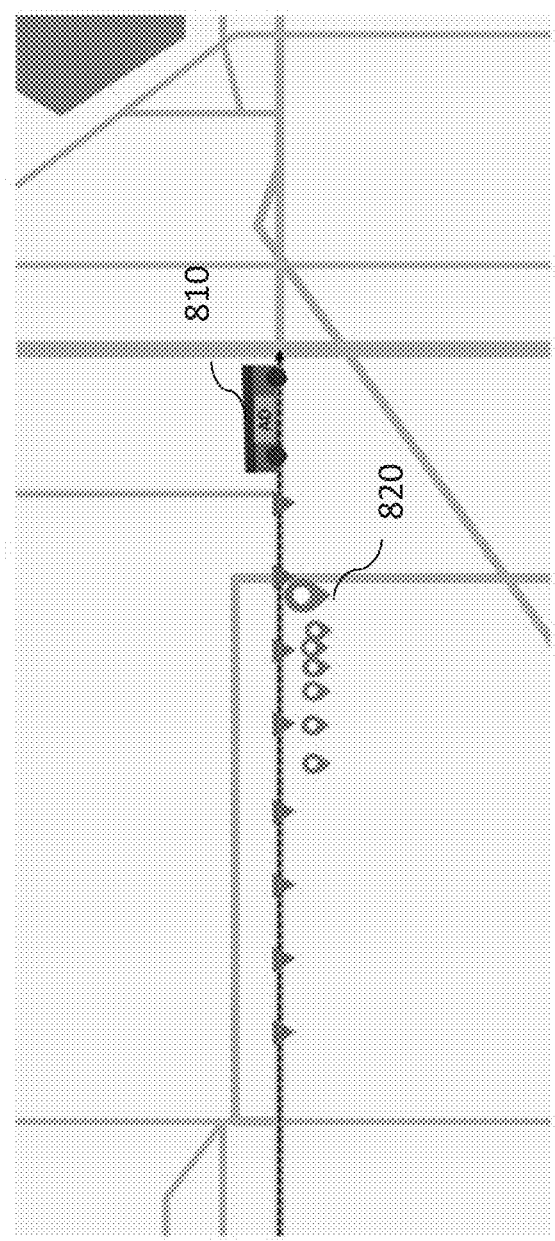
FIG. 8 is a diagram illustrating a comparison of placement characteristics of content presented by an in motion physical object to location information of a target mobile device.

As described herein, the content exposure system 150 may determine exposures of mobile devices 110 to various types of OOH advertising, such as in motion objects and indoor environments. Example OOH types include:

Takeover advertising in indoor environments, such as in a subway tunnel, mall, airport, arena, stadium, and so on. In such environments, the content exposure system 150 may determine when an indoor environment is entered, and predict a high exposure probability;

Cinema advertising, where advertisements are often shown in theaters before the start of a movie. The content exposure system 150 may utilize a combination of visitation estimation and surveys to define exposure for cinema advertising, and determine a device is exposed when the visit is made to a target theater location and a panelist arrived 10 minutes before the movie start time, as measured by a visit estimation system or a survey;

Transit Wraps and Transit-Side advertising, where a bus wrapped in a graphical advertisement and/or posters shown on the back and side of transit vehicles. The content exposure system 150 may determine viewability or exposure intersecting a device's location trace with static or real-time bus schedules. For example, FIG. 8 depicts a bus with presented content 810 travelling within a location 800, and the position 820 of the mobile device is known to be near the bus (e.g., within 60 ft). When the bus 810 is within a certain distance to the position 820 of the mobile device 110, the device 110 enters a moving viewshed established for the wrapped advertisements of the bus 810, and the content exposure system 150 may determine an exposure;

Inside Transit Card advertising, where advertisements appear above the windows inside the passenger compartment of buses and trains. The content exposure system 150 may utilize location data, and static or real-time bus schedules, to determine viewability or exposures by detecting when the mobile device 110 is traveling on a bus or train that has a known advertisement The content exposure system 150 may perform a location match to correlate in space and time the user location with the location of the bus or train; and/or may perform a sensor match to correlate a pattern of activity across the various device sensors (e.g., accelerometer, gyroscope, compass, and so on) with signatures known to be evident when a device is traveling on a bus or train; and so on.

Thus, in some embodiments, the content exposure system 150 may determine a user was exposed to content presented by a physical object. The content exposure system 150 determines a mobile device associated with the user is located within a viewshed of the content presented by the physical object, and determines the mobile device associated with the user moved toward a facing direction of the physical object, where the facing direction of the physical object is a direction that presents the content.

Suitable Computing Devices

Figure 9:
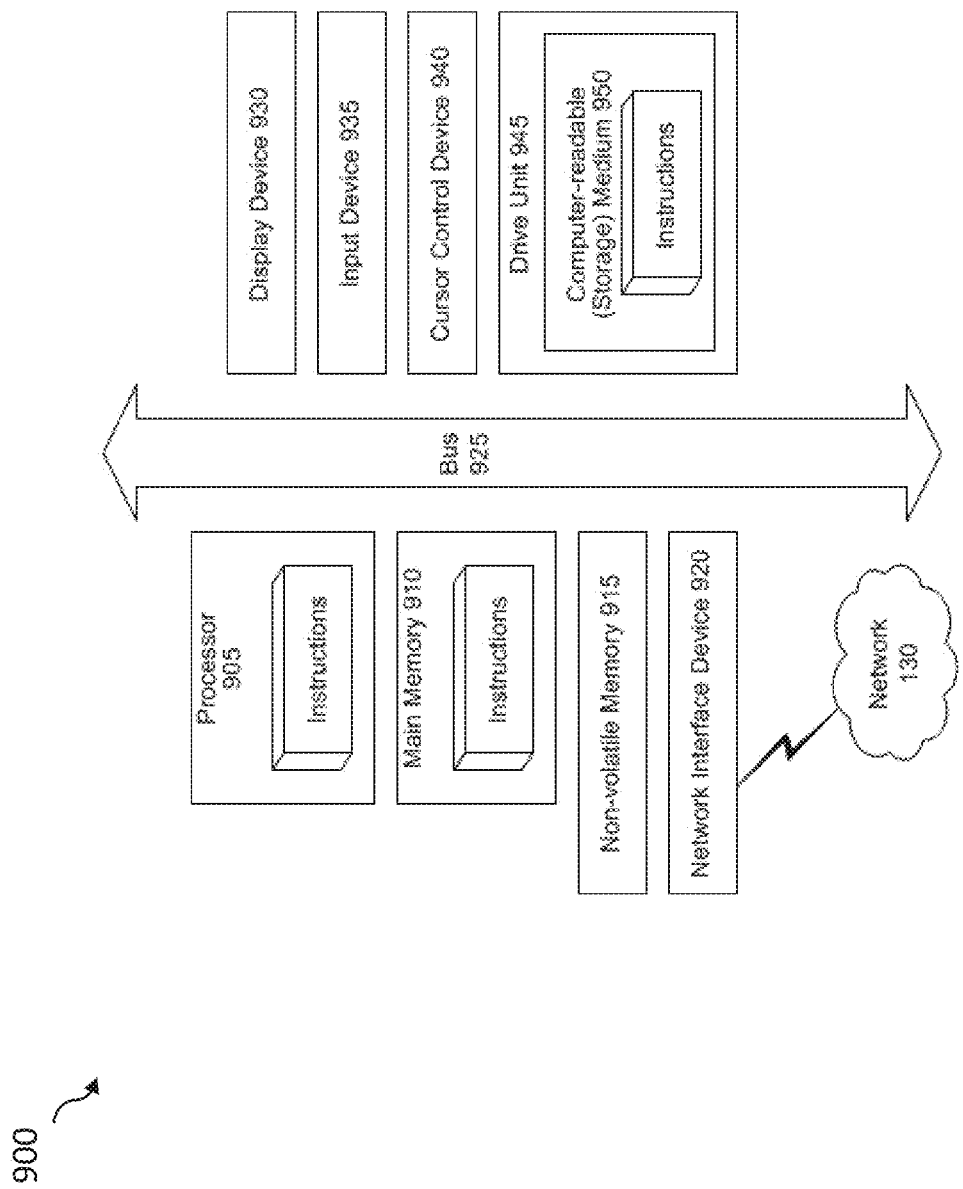
FIG. 9 is a block diagram illustrating a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system within which a set of instructions, for causing the machine to perform any one or more of the methodologies discussed herein, may be executed.

In the example of FIG. 9, the computer system 900 includes a processor 905, main memory 910, non-volatile memory 915, and an interface device 920. Various common components (e.g., cache memory) are omitted for illustrative simplicity. The computer system 900 is intended to illustrate a hardware device on which the systems and methods can be implemented. The computer system 900 can be of any applicable known or convenient type. The components of the computer system 900 can be coupled together via a bus or through some other known or convenient device.

The processor 905 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory 910 is coupled to the processor by, for example, a bus 925. The memory can include, by way of example but not limitation, random access memory (RAM), such as dynamic RAM (DRAM) and static RAM (SRAM). The memory can be local, remote, or distributed.

The bus 925 also couples the processor to the non-volatile memory 915 and drive unit 945. The non-volatile memory 915 is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium 950." A processor is considered to be "configured to execute a program" when at least one value associated with the program is stored in a register readable by the processor.

The bus 925 also couples the processor to the network interface device 920. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input 935 and/or output devices. The I/O devices can include, by way of example but not limitation, a keyboard, a mouse or other pointing device 940, disk drives, printers, a scanner, and other input and/or output devices, including a display device 930. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments of the attribution system have been described herein for purposes of illustration, but that various modifications may be made without deviating from the spirit and scope of the embodiments. Accordingly, the embodiments are not limited except as by the appended claims.

We claim:

1. A system, comprising:
   at least one server computer coupled to a network;
   at least one memory storing instructions for execution by the computer, wherein the instructions are configured to cause the server computer to perform operations comprising:
   receiving, by one or more processors, GPS data from a mobile device at a geographic location, the GPS data comprising a series of location coordinates that identify the geographic location;
   determining a heading of the mobile device based on the series of location coordinates, the heading of the mobile device indicating a direction of travel, wherein determining the heading comprises determining a device heading angle based at least upon the GPS data, accelerometer data, and gyroscope data collected from the mobile device;

retrieving object placement information through a network from a database separate from the system and associated with the geographic location of the mobile device, the database comprising at least the object placement information of content presented by a physical object at the geographic location identified by the series of location coordinates received from the mobile device, the object placement information indicating at least a viewshed characteristic of the physical object that presents the content;

computing an exposure probability of the mobile device to the content presented by the physical object based on a comparison of the heading of the mobile device and the viewshed characteristic of the physical object, wherein the exposure probability represents a probability that a user of the mobile device perceived the content presented by the physical object, and wherein computing the exposure probability comprises:

when the device heading angle indicates that the mobile devices is heading towards the physical object, increasing the exposure probability;

determining a dwell duration within the view shed of the physical object at least upon the GPS data, the accelerometer data, and the gyroscope data collected from the mobile device; and when the dwell duration exceeds a threshold time period, increasing the exposure probability; and attributing the exposure probability of the mobile device to the content to a conversion event associated with the user within an impression log, in response to the computing the exposure probability.

2. A computer-implemented method of providing content exposure information to an attribution system, the method comprising:

receiving GPS data associated with a target mobile device, the GPS data comprising a series of location coordinates that identify a geographic location;

determining a heading of the target mobile device based on the series of location coordinates, the heading of the target mobile device indicating a direction of travel, wherein determining the heading comprises determining a device heading angle based at least upon the GPS data, accelerometer data, and gyroscope data collected from the mobile device;

retrieving object placement information through a network from a database separate from the system and associated with the geographic location of the target mobile device, the database comprising at least the object placement information of content presented by a physical object at the geographic location identified by the series of location coordinates received from the mobile device, the object placement information indicating at least a viewshed characteristic of the physical object that presents the content;

computing an exposure probability of the mobile device to the content presented by the physical object based on a comparison of the heading of the target mobile device to the viewshed characteristic of the physical object, wherein the exposure probability represents a probability that a user of the target mobile device perceived the content presented by the physical object, and wherein computing the exposure probability comprises:

when the device heading angle indicates that the mobile devices is heading towards the physical object, increasing the exposure probability;

determining a dwell duration within the view shed of the physical object at least upon the GPS data, the accelerometer data, and the gyroscope data collected from the mobile device; and when the dwell duration exceeds a threshold time period, increasing the exposure probability; and providing the exposure probability of the mobile device to an attribution system; and attributing the exposure probability of the mobile device to the content to a conversion event associated with the user within an impression log of the attribution system, in response to the computing the exposure probability.

3. The computer-implemented method of claim 2, wherein determining the exposure probability includes:

determining the exposure probability as a function of the GPS data and the view shed characteristic of the physical object, wherein the function is formulated as: L_exposure=F(EXPOSURE|Pu, Bi);

where L_exposure is the exposure probability, EXPOSURE is a state of exposure, Pu is a set of location trace characteristics for the target mobile device, and Bi is a set of placement characteristics of the content presented by the physical object.

4. The computer-implemented method of claim 2, wherein determining the dwell duration comprises:

determining the dwell duration based at least upon a comparison of the GPS data, the accelerometer data, and the gyroscope data to the view shed characteristic of the physical location.

5. The computer-implemented method of claim 2, further comprising:

retrieving survey information associated with the content presented by the physical object, wherein the survey information includes information from users of other mobile devices that viewed the content presented by the physical object; and determining the exposure probability based on a comparison of the GPS data to the view shed characteristic of the physical object and the survey information.

6. The computer-implemented method of claim 2, wherein determining the exposure probability includes determining an exposure probability of 0 percent to 100 percent.

7. The computer-implemented method of claim 2, wherein determining the exposure probability includes determining a confirmed exposure, wherein determining the confirmed exposure includes:

determining that a heading of the mobile device with respect to the content presented by the physical object is within an angle of 90 degrees.

8. The computer-implemented method of claim 2, wherein receiving the GPS data associated with the mobile device includes receiving information from one or more GPS sensors of the mobile device.

9. The computer-implemented method of claim 2, wherein receiving the object placement information associated with the content presented by the physical object includes:

receiving lat-long coordinates of the physical object; and determining a facing angle of the content presented by the physical object.

10. The computer-implemented method of claim 2, wherein the content presented by the physical object at the certain geographic location is an advertisement presented by a billboard.

11. The computer-implemented method of claim 2, wherein the content presented by the physical object at the certain geographic location is an advertisement presented by a vehicle traveling within the certain geographic location.

12. A non-transitory computer-readable storage medium whose contents, when executed by a computing system, cause the computing system to perform operations for determining a user was exposed to content presented by a physical object, the operations comprising:

receiving GPS data from a mobile device at a geographic location, the GPS data comprising a series of location coordinates that identify the geographic location;

determining a heading of the mobile device based on the series of location coordinates, the heading of the mobile device indicating a direction of travel, wherein determining the heading comprises determining a device heading angle based at least upon the GPS data, accelerometer data, and gyroscope data collected from the mobile device;

retrieving object placement information through a network from a database separate from the system and associated with the geographic location of the mobile device, the database comprising at least the object placement information of content presented by a physical object at the geographic location identified by the series of location coordinates received from the mobile device, the object placement information indicating at least a viewshed characteristic of the physical object that presents the content;

computing an exposure probability of the mobile device to the content presented by the physical object based on a comparison of the heading of the mobile device and the viewshed characteristic of the physical object, wherein the exposure probability represents a probability that a user of the mobile device perceived the content presented by the physical object, and wherein computing the exposure probability comprises:

when the device heading angle indicates that the mobile devices is heading towards the physical object, increasing the exposure probability;

determining a dwell duration within the view shed of the physical object at least upon the GPS data, the accelerometer data, and the gyroscope data collected from the mobile device; and when the dwell duration exceeds a threshold time period, increasing the exposure probability; and attributing the exposure probability of the mobile device to the content to a conversion event associated with the user within an impression log, in response to the computing the exposure probability.

13. The non-transitory computer-readable storage medium of claim 12, wherein the content presented by the physical object is an advertisement presented by a billboard.

* * * * *